US009732756B2

(12) United States Patent
An et al.

(10) Patent No.: US 9,732,756 B2
(45) Date of Patent: Aug. 15, 2017

(54) CENTRIFUGAL COMPRESSOR

(75) Inventors: Byeongil An, Tokyo (JP); Hiroshi Suzuki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 270 days.

(21) Appl. No.: 14/414,716

(22) PCT Filed: Aug. 30, 2012

(86) PCT No.: PCT/JP2012/072038
§ 371 (c)(1),
(2), (4) Date: Jan. 30, 2015

(87) PCT Pub. No.: WO2014/033878
PCT Pub. Date: Mar. 6, 2014

(65) Prior Publication Data
US 2015/0192133 A1 Jul. 9, 2015

(51) Int. Cl.
*F04D 29/44* (2006.01)
*F04D 17/12* (2006.01)
(Continued)

(52) U.S. Cl.
CPC ............ *F04D 17/12* (2013.01); *F02B 37/225* (2013.01); *F02B 39/04* (2013.01); *F04D 25/024* (2013.01);
(Continued)

(58) Field of Classification Search
CPC .... F04D 17/12; F04D 25/024; F04D 27/0207; F04D 27/0246; F04D 29/4213;
(Continued)

(56) References Cited

U.S. PATENT DOCUMENTS 3,362,624 A * 1/1968 Endress ............... F04D 27/0215
415/1
4,219,305 A * 8/1980 Mount .................. F04D 29/464
415/13
(Continued)

FOREIGN PATENT DOCUMENTS

CN    1039087 A    1/1990
CN    1167881 A    12/1997
(Continued)

OTHER PUBLICATIONS

Machine Translation of JP2006002650 from espacenet website, retrieved on Jan. 23, 2017.*
(Continued)

*Primary Examiner* — Jessica Cahill
(74) *Attorney, Agent, or Firm* — Birch, Stewart, Kolasch & Birch, LLP

(57) ABSTRACT

A centrifugal compressor includes a compressor housing, an impeller wheel which compresses intake gas from an intake-air inlet, a plurality of guide vanes disposed circumferentially along an inner circumferential wall of the intake-air channel between the intake-air inlet and the impeller wheel to swirl the intake gas around the rotational axis, a central intake-air flow path formed at an inner side of the guide vanes to allow the intake gas to flow to the impeller wheel without passing through the guide vanes, and a guide-vane moving mechanism which simultaneously changes the inclination angle of the guide vanes. Guide vanes generate swirl flow at an inner circumferential housing portion of an impeller wheel to improve a surge margin and to restrict decrease in a choke flow rate.

8 Claims, 8 Drawing Sheets

(51) Int. Cl.
    *F02B 37/22*     (2006.01)
    *F02B 39/04*     (2006.01)
    *F04D 27/02*     (2006.01)
    *F04D 25/02*     (2006.01)
    *F04D 29/46*     (2006.01)
    *F04D 29/42*     (2006.01)
    *F01D 17/16*     (2006.01)

(52) U.S. Cl.
    CPC ..... *F04D 27/0207* (2013.01); *F04D 27/0246* (2013.01); *F04D 29/4213* (2013.01); *F04D 29/462* (2013.01); *F01D 17/162* (2013.01); *F05D 2250/51* (2013.01); *Y02T 10/144* (2013.01)

(58) Field of Classification Search
    CPC ...... F04D 29/462; F02B 37/225; F02B 39/04; F01D 17/162; F05D 2250/51; Y02T 10/144
    See application file for complete search history.

(56) References Cited

U.S. PATENT DOCUMENTS

| | | | | |
|---|---|---|---|---|
| 4,363,596 | A * | 12/1982 | Watson | F04D 27/0246 415/1 |
| 4,844,690 | A * | 7/1989 | DeLaurier | F01D 17/143 415/148 |
| 4,969,798 | A | 11/1990 | Sakai et al. | |
| 5,116,197 | A * | 5/1992 | Snell | F04D 29/464 415/126 |
| 5,669,756 | A * | 9/1997 | Brasz | F04D 27/0215 415/47 |
| 6,039,534 | A * | 3/2000 | Stoner | F01D 17/162 415/150 |
| 2005/0002782 | A1* | 1/2005 | Nikpour | F04D 27/0246 415/208.1 |

FOREIGN PATENT DOCUMENTS

| | | |
|---|---|---|
| EP | 0 331 902 A2 | 9/1989 |
| EP | 0 381 399 A2 | 8/1990 |
| EP | 2 194 279 A1 | 6/2010 |
| JP | 39-19309 B1 | 9/1964 |
| JP | 54-22011 A | 2/1979 |
| JP | 58-18600 A | 2/1983 |
| JP | 10-26027 A | 1/1998 |
| JP | 10-339152 A | 12/1998 |
| JP | 2000-64848 A | 2/2000 |
| JP | 2004-27931 A | 1/2004 |
| JP | 2004-332733 A | 11/2004 |
| JP | 2006-2650 A | 1/2006 |
| JP | 2007-127109 A | 5/2007 |
| JP | 2009-209694 A | 9/2009 |

OTHER PUBLICATIONS

Chinese Office Action and Search Report for Chinese Application No. 201280074578.0, dated Jun. 8, 2016, with an English translation.

Extended European Search Report, issued Apr. 9, 2015, for European Application No. 12883778.8.

International Preliminary Report on Patentability and Written Opinion of the International Searching Authority (forms PCT/IB/373, PCT/ISA/237, PCT/IB/326 and PCT/IB/338), issued Mar. 12, 2015, for International Application No. PCT/JP2012/072038, along with a translation of the Written Opinion.

International Search Report and Written Opinion of the International Searching Authority (forms PCT/ISA/210, PCT/ISA/237 and PCT/ISA/220), issued Nov. 20, 2012, for International Application No. PCT/JP2012/072038.

Japanese Notice of Allowance, issued Jul. 18, 2014, for Japanese Application No. 2014-501353, along with an English translation.

European Office Action effective May 6, 2016, issued in the corresponding EP Application No. 12883778.8.

* cited by examiner

CENTRIFUGAL COMPRESSOR

TECHNICAL FIELD

The present invention relates to a centrifugal compressor including an impeller wheel which is rotated by a rotational shaft.

BACKGROUND

In the field of engines used in vehicles, for instance, a widely-known exhaust turbocharger rotates a turbine by energy of exhaust gas of an engine, then compresses intake air by a centrifugal compressor directly connected to the turbine via a rotational shaft, and supplies the compressed air to the engine in order to improve the output of the engine.

As represented by the normal compressor of the performance-characteristic comparison chart in FIG. 10 where y-axis is the pressure ratio and x-axis is the flow rate, a compressor of such an exhaust turbocharger is stably operated in the flow-rate range from a surge flow rate (left-hand line in the drawing) at which surging, or pulsation of the entire system, occurs, to a choke flow rate (right-hand line in the drawing) at which choking occurs and the flow rate stops increasing.

However, in a centrifugal compressor of the normal compressor type in which intake air is directly introduced into an impeller wheel, the flow-rate range between the choke flow rate and the surge flow rate where stable operation is possible is narrow. Thus, there is a problem in that it is necessary to operate the compressor at an inefficient operation point which is differed from the surge flow rate, in order to avoid surging.

In order to solve the above problem, Patent Document 1 discloses a technique of increasing the operation range of an exhaust turbocharger by providing guide vanes at the upstream side of an impeller wheel of the centrifugal compressor to swirl intake air at the upstream side of the impeller wheel, and a technique of providing a recirculation flow path for a housing of a supercharger to recirculate a part of intake gas introduced into the impeller wheel.

Such techniques will be described briefly in reference to FIG. 9.

An impeller wheel 201 of a centrifugal compressor 200 includes a plurality of vanes 204 which are rotatable in a housing 202, and the housing 202 includes an inner wall disposed in the vicinity of radially outer edges 204a of the vanes 204.

An intake-gas inlet of the centrifugal compressor 200 includes an outer annular wall 207 forming a gas inlet 208, and an inner annular wall 209 extending inside the outer annular wall 207 to form an inducer part 210. An annular gas flow channel 211 is formed between the annular walls 209, 207.

A housing surface 205 by which the vanes 204 pass through is in communication with the annular flow channel 211 via a downstream opening part 213.

An upstream opening part brings the annular flow channel 211 into communication with the inducer part 210 being the inlet intake part. Inlet guide vanes 214 are provided inside the inducer part 210 downstream with respect to the upstream opening part to induce precedent swirls in the gas flow passing through the inducer part 210. When the flow rate of the air passing through the compressor is small due to the above configuration, the direction of the air flow passing through the annular flow channel 211 is reversed, and the air flows from the impeller wheel through an opening 213 and the annular flow channel 211 extending in the upstream direction to be introduced again into the gas inlet 208, so as to recirculate in the compressor.

As a result, performance of the compressor is stabled, and the compressor surge margin and the choke flow are both improved (see "RCC (recirculation compressor)" of FIG. 10).

Further, Patent Document 1 discloses that the inner annular wall 209 and the outer annular wall 207 extend in the upstream direction and house an inlet guide-vane apparatus. The inlet guide-vane apparatus includes a plurality of the inlet guide vanes 214 extending between a center nose cone 215 and the inner annular wall 209.

The inlet guide vanes 214 sweep forward in the rotational direction of the impeller wheel 201 to induce precedent swirls in the air flow which reaches the impeller wheel 201. The precedent swirls improve the surge margin (surge limit) of the compressor. In other words, the precedent swirl flow reduces the flow which causes surging in the compressor. (see the "RCC with guide vanes" of FIG. 10).

CITATION LIST

Patent Literature

Patent Document 1: Japanese Unexamined Patent Application Publication No. 2004-332733 (see Abstract and FIG. 1)

SUMMARY

Technical Problem

In the conventional art illustrated in FIG. 9, however, the fact that the center nose cone 115 is positioned in the central space of the inner annular wall in front of the impeller wheel definitely increases intake-air resistance and reduces the choke flow with respect to the intake flow at the center nose cone 215, though not illustrated in FIG. 11. Also, it is difficult to manufacture the center nose cone 215 and to attach the center nose cone on the center axis of the guide vanes.

That is, the conventional guide vanes for generating swirl flow have a problem in that a member having a cone shape for directing intake-air to the guide vanes is disposed in the central part of the guide vanes, which increases the air resistance and reduces the choke flow rate.

Further, while the inlet guide-vanes 214 are provided in the conventional art illustrated in FIG. 9 to induce precedent swirl in the gas flow passing through the inducer part 210, the vane angle of the inlet guide vanes 214 is fixed at a certain angle and thus the swirling direction of the swirl flow is always the same.

Especially, a fixed vane angle of the inlet guide vanes 214 leads to constant generation of certain flow resistance with respect to the intake-air flow, which reduces the choke flow rate.

In view of the above technical problems, an object of the present invention is to improve a surge margin without reducing the choke flow, unlike the convention art, by providing guide vanes directly on the housing inner circumferential side in front of the impeller wheel without providing a center nose cone.

Furthermore, an object of the present invention is to make the inclination angle of the guide vanes for generating a swirl flow variable to control the inclination angle to be suitable for the operation state of a compressor, so that the air resistance is reduced to restrict the decrease in the choke flow rate while reducing the surge flow rate, thereby increasing the operation range of the compressor.

Solution to Problem

In order to achieve the above object, a centrifugal compressor of the present invention includes: a housing having an intake-air inlet which opens in a direction of a rotational axis of the centrifugal compressor, and an intake-air channel which connects to the intake-air inlet; an impeller wheel disposed inside the housing rotatably around the rotational axis, and configured to compress intake gas which flows in from the intake-air inlet; a plurality of guide vanes disposed in a circumferential direction along an inner circumferential wall of the housing between the intake-air inlet and the impeller wheel and configured to swirl the intake gas flowing in from the intake-air inlet around the rotational axis; a central intake-air flow path formed at an inner circumferential side of the plurality of guide vanes and configured to allow the intake gas flowing in from the intake-air inlet to flow to the impeller wheel without passing through the guide vanes; and a guide-vane moving mechanism which simultaneously changes inclination angles of the plurality of guide vanes with respect to the direction of the rotational axis.

Accordingly, swirling the intake-air gas flowing in from the intake-air inlet reduces the surge flow rate (minimum flow rate) to improve the surge margin, and reduces the flow resistance of the intake gas in the center intake-air flow channel to restrict the decrease in the choke flow rate (maximum flow rate). As a result, it is possible to increase the operation range.

Further, making the inclination angle of the guide vanes variable further promotes reduction of the surge flow rate (minimum flow rate) and restriction of decrease in the choke flow rate (maximum flow rate). That is, in accordance with the operation state of the internal combustion engine, i.e., in accordance with the flow rate of the flow passing through the compressor, it is possible to change the inclination angle of the guide vanes. Thus, during operation at a low flow rate, for instance, it is possible to reduce the surging generation flow rate of the compressor by means of the swirl flow by increasing the vane inclination angle. Also, during operation at a high flow rate, it is possible to restrict the decrease in the choke flow rate by reducing the vane inclination angle.

Further, preferably in the present invention, each guide vane includes a guide-vane main shaft around which each guide vane is rotated. Also, each guide-vane main shaft extends toward a center of the intake-air channel and has an outer end portion penetrating a circumferential wall of the intake-air channel to be positioned at an outer side of the housing and coupled to the guide-vane moving mechanism.

Accordingly, the guide-vane main shafts of the plurality of guide vanes arranged in the circumferential direction of the intake-air flow channel are each rotated from the outside of the housing. Thus, it is possible to control the inclination angle of the guide vanes without affecting the flow of the intake-air gas flowing through the intake-air flow channel. As a result, it becomes possible to achieve variable-geometry guide vanes without increasing the intake-air resistance.

Further, preferably in the present invention, the guide-vane moving mechanism includes: a drive ring of an annular shape disposed so as to surround the outer side of the housing to be rotatable along an outer circumference of the housing; lever members which couple the drive ring and the outer end portions of the guide-vane main shafts; and an actuator which rotates the drive ring.

Accordingly, the guide-vane moving mechanism includes the drive ring of an annular shape which is rotatable mainly around the outer circumference of the housing. Thus, the guide-vane moving mechanism is mounted around the housing, thereby achieving a compact guide-vane moving mechanism which does not protrude considerably with respect to the housing to be increased in size. Further, it is possible to rotate the plurality of guide vanes simultaneously and accurately at an identical inclination angle.

Further, preferably in the present invention, a return spring is disposed between each guide-vane main shaft and the housing, the return spring applying a biasing force to constantly return the inclination angle of each guide vane with respect to the direction of the rotational axis to zero.

As described above, a biasing force is applied so as to return the inclination angle of the guide vanes to zero by the return spring, which makes it possible to prevent the guide vanes from getting stuck while rotating and becoming difficult to rotate.

Further, preferably in the present invention, each guide vane is formed by a plate-like member and has a trapezoidal shape which is tapered toward a center of the intake-air channel and is arranged so that a face of the plate-like member is along a flowing direction of the intake-air channel, each guide vane having a height substantially identical to a height of a leading edge of each vane of the impeller wheel.

As described above, the guide vanes are arranged so that the faces of the plate-like members of a tapered trapezoidal shape are disposed along the intake gas flow, which makes it possible to arrange the guide vanes in the intake-air channel without causing great loss in the intake-air flow. Also, it becomes possible to support the guide vanes in a cantilever fashion at the outer circumferential side while maintaining strength because the guide vanes are tapered.

Further, the height of the guide vanes is substantially the same as the height of the leading edges of the vanes of the impeller wheel. Thus, it is possible to direct the swirl flow generated by the guide vanes to the vanes of the impeller wheel efficiently.

Further, preferably in the present invention, the housing includes a recirculation flow path which is disposed on an outer side of the intake-air channel and which brings an outer circumferential section of vanes of the impeller wheel into communication with the intake-air channel at an upstream side of the impeller wheel.

Accordingly, in addition to the improvement of the surge margin achieved by swirling the intake flow introduced to the impeller wheel by the guide vanes as described above, it is possible to further improve the surge margin because it is possible to reduce the surge flow rate by circulating a part of the flow gas introduced to the impeller via the recirculation flow path which brings the outer circumferential part of the vanes of the impeller wheel into communication with the intake-air channel at the upstream side with respect to the impeller wheel.

Further, preferably in the present invention, an opening end portion of an upstream side of the recirculation flow path is positioned upstream with respect to the guide vanes.

As described above, the opening end portion of the upstream side of the recirculation flow path is positioned upstream with respect to the guide vanes, which causes the circulated intake gas to pass through the guide vanes to swirl the intake gas to a greater extent. As a result, the surge margin is further improved.

Further, preferably in the present invention, the housing is divided in half into an upstream housing and a downstream housing at a position where the recirculation flow path is divided.

As described above, the compressor housing is divided in half into the upstream housing and the downstream housing at the position where the recirculation flow path is divided, which makes it possible to process the circulation voids of the recirculation flow path from the divided surfaces of the housing, which facilitates formation of the recirculation flow path.

Advantageous Effects

According to the present invention, swirling the intake gas having flowed in from the intake-air inlet reduces the surge flow rate (minimum flow rate) to improve the surge margin, and reduces the flow resistance of the intake gas in the center intake-air flow channel to restrict the decrease in the choke flow rate (maximum flow rate). As a result, it is possible to increase the operation range.

Further, making the inclination angle of the guide vanes variable makes it possible to vary the vane inclination angle of the guide vanes in accordance with the flow rate passing through the compressor.

For instance, during operation at a low flow rate, for instance, the vane inclination angle is increased so that the swirl flow further reduces the flow rate at which the surging occurs in the compressor. Also, during operation at a high flow rate, it is possible to restrict the decrease in the choke flow rate by reducing the vane inclination angle.

Furthermore, preferably in the present invention, the intake-air channel has an inner diameter including a small diameter similar to a diameter at a leading edge part of vanes of the impeller wheel, and a large diameter at an inflow side, the large diameter being larger than the small diameter.

Also, the large diameter of the intake-air channel may be set so as to increase an area of a flow path corresponding to at least an area of the flow path which is reduced by the guide vanes blocking the flow path.

Accordingly, it is possible to increase the flow path having been reduced by the guide vanes, so that there is no longer the influence of the flow resistance caused by the guide vanes, which makes it possible to improve efficiency and to restrict the decrease in the choke flow rate (maximum flow rate).

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

(First Embodiment)

Figure 1:
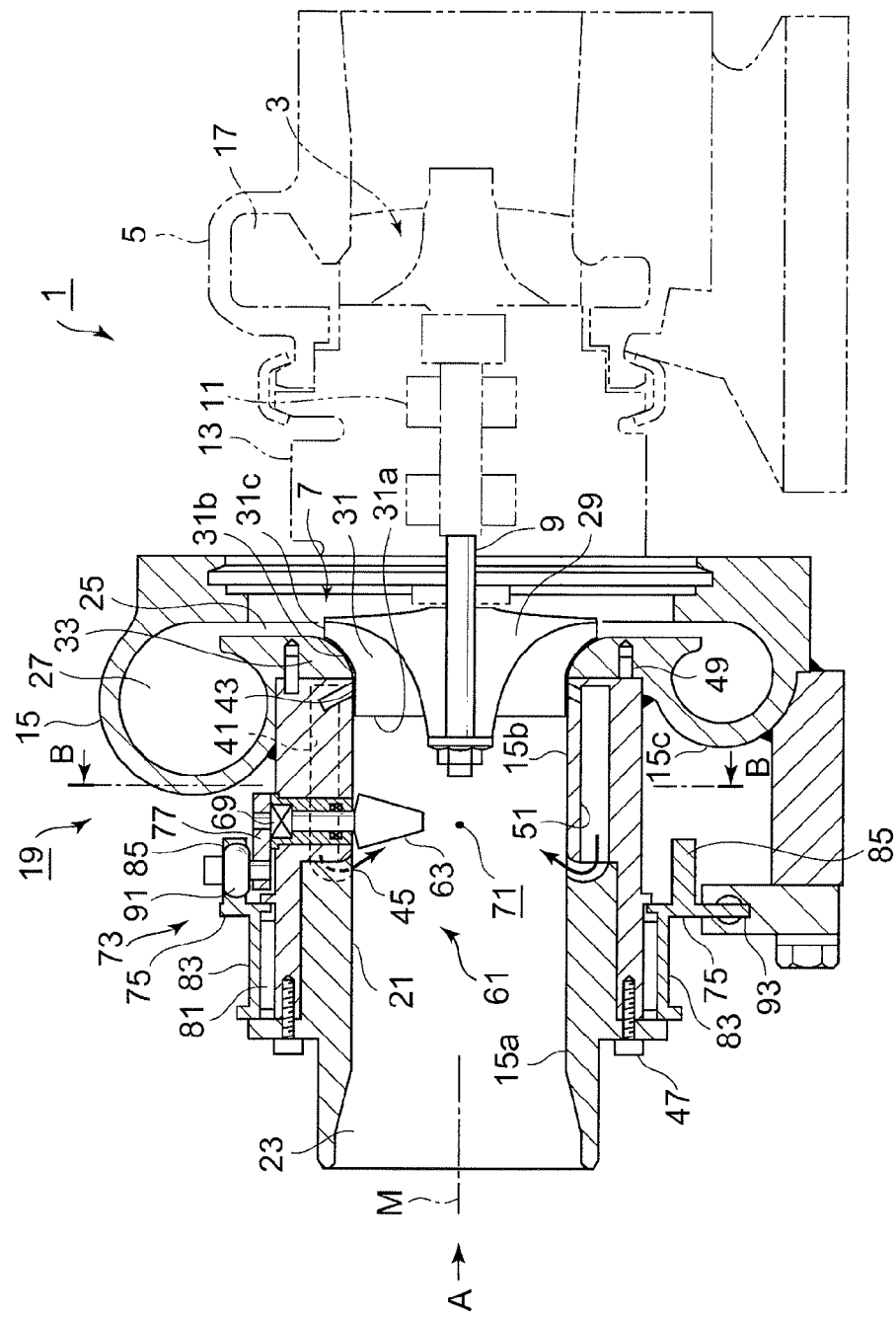
FIG. 1 is a partial cross-sectional view of a centrifugal compressor in the direction of a rotational axis according to the first embodiment of the present invention.

FIG. 1 is a partial cross-sectional view of an exhaust turbocharger 1 of an internal combustion engine in the direction of the rotational axis. The exhaust turbocharger 1 includes a turbine housing 5, a bearing housing 13, and a compressor housing 15 coupled together. The turbine housing 5 accommodates a turbine rotor 3 which is driven by exhaust gas of the internal combustion engine. The bearing housing 13 supports a rotational shaft 9 which transmits a rotational force of the turbine rotor 3 to an impeller wheel 7 to be freely rotatable via a bearing 11. The compressor housing 15 accommodates the impeller wheel 7 which draws in and compresses air as intake gas.

A scroll channel 17 of a spiral shape is formed on the outer circumferential part of the turbine housing 5 so as to surround the outer circumference of the turbine rotor 3, so that exhaust gas from the internal combustion engine flows toward the axial center from the outer circumferential side and exits in the axial direction to rotate the turbine rotor 3.

The compressor (centrifugal compressor) 19 according to the present invention includes the impeller wheel 7 which is supported inside the compressor housing 15 to be rotatable around the rotational axis line M of the rotational shaft 9. An intake-air channel 21 which introduces intake gas not having been compressed, the air for instance, to the impeller wheel 7 extends in the direction of the rotational axis line M and coaxially so as to form a cylindrical shape. Also, an intake-air inlet 23 opens at the end of the intake-air channel 21 to connect to the intake-air channel 21. The intake-air inlet 23 has a diameter increasing toward the end to have a tapered shape so as to facilitate introduction of the air.

A diffuser 25 is formed on the outer side of the impeller wheel 7, extending in a direction perpendicular to the rotational axis line M. An air channel 27 of a spiral shape is disposed on the outer circumference of the diffuser 25. The air channel 27 of a spiral shape forms the outer circumferential part of the compressor housing 15.

Also, the impeller wheel 7 includes a hub section 29 which is driven to rotate around the rotational axis line M and a plurality of vanes 31 which are driven to rotate with the hub 29 section. The hub section 29 is mounted to the rotational shaft 9, and the plurality of vanes 31 are attached to the radially outer face of the hub section 29.

The vanes 31 are driven to rotate and compress the air drawn in from the intake-air inlet 23 through the intake-air channel 21. The shape of each vane 31 is not particularly limited. Each vane 31 includes a leading edge 31a which is an edge portion on the upstream side, a trailing edge 31b which is an edge portion on the downstream side, and an outer circumferential edge (outer circumferential portion) 31c which is an edge portion on the radially outer side. The outer circumferential edge 31c is a lateral edge portion covered by a shroud section 33 of the compressor housing 15. Also, the outer circumferential edges 31c are arranged so as to pass by the vicinity of the inner surface of the shroud section 33.

The impeller wheel 7 of the compressor 19 is driven to rotate around the rotational axis line M by the rotational driving force of the turbine rotor 3. Then, the outside air is drawn in from the intake-air inlet 23 to flow through the vanes 31 of the impeller wheel 7, so that the dynamic pressure is mainly increased. Subsequently, the air flows into the diffuser 25 disposed on the radially outer side, has a part of the dynamic pressure converted into static pressure so that the pressure is increased, and then exits through the air channel 27 of a spiral shape. Then, the air is supplied to the internal combustion engine as intake air.

(Recirculation Flow Path)

Next, a recirculation flow path 41 formed in the compressor housing 15 will be described.

The recirculation flow path 41 is disposed so as to bring a downstream opening end portion 43 of an annular shape into communication with an upstream opening end portion 45. The downstream opening end portion 43 opens at the inner circumferential wall of the compressor housing 15 facing the outer circumferential edges 31c of the vanes 31. The upstream opening end portion 45 opens at the inner circumferential wall of the compressor housing 15 at the upstream side with respect to the leading edges 31a of the vanes 31.

Further, a part of the air immediately after having flowed into gaps between the plurality of vanes 31 or a part of the air being pressurized is re-circulated into the intake-air channel 21 at the upstream side of the vanes 31 through the recirculation flow path 41.

Further, the recirculation flow path 41 includes a plurality of circulation voids 51 arranged on the circumference around the rotational axis line M at the outer side of the intake-air channel 21 of a cylindrical shape.

Further, the compressor housing 15 is divided in half into the upstream housing 15a and the downstream housing 15b at a position in middle of the recirculation flow path 41, and further divided into three to include a shroud-side housing 15c having an air channel 27 of a spiral shape at the further downstream side of the downstream housing 15b.

The abutting surfaces between the upstream housing 15a and the downstream housing 15b are each formed to have a stair-like shape, so that positions are determined in the direction of the rotational axis line M and in the radial direction orthogonal to the rotational axis line M by spigot-and-socket fitting. Also, the upstream housing 15a and the downstream housing 15b are coupled to each other by bolts 47.

Further, the downstream housing 15b and the shroud-side housing 15c have their positions determined by pins 49 and joined to each other by welding.

Further, in the upstream housing 15a and the downstream housing 15b, a plurality of the circulation voids 51 are formed to extend in the direction of the rotational axis line M, constituting the circulation flow path 41 on the circumference around the rotational axis line M.

Figure 5:
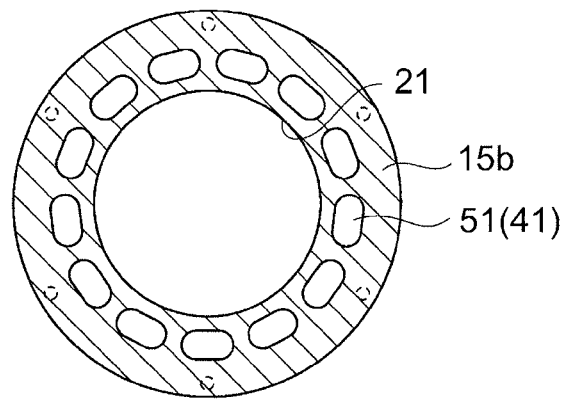
FIG. 5 is a partial cross-sectional view taken along line B-B of FIG. 1.

FIG. 5 illustrates a partial cross-sectional view taken along line B-B of the downstream housing 15b. As illustrated in FIG. 5, in the present embodiment, a plurality of, for example, thirteen, circulation voids 51 of a substantially ellipse shape are arranged at equal intervals on the same circumference at the outer side of the intake-air channel 21, so that the longitudinal directions of the ellipse shapes are along the circumferential direction.

On the dividing surfaces of the upstream housing 15a and the downstream housing 15b, curving concaved grooves of an annular shape forming the upstream opening end portions 45 are formed. The curving shape of the concaved grooves is oriented in the direction in which the return-flow air is discharged toward the impeller wheel 7.

As described above, it is possible to machine the circulation voids 51 of the recirculation flow path 41 and the concaved grooves 53 of the upstream opening end portions 45 from the divided surfaces of the upstream housing 15a and the downstream housing 15b, respectively, which facilitates formation of the recirculation flow path 41.

The recirculation flow path 41, when being provided, functions as follows.

In a flow-rate state where the amount of air flowing through the compressor 19 is appropriate, the air flowing through the recirculation flow path 41 first flows in from the intake-air inlet 23, and then flows through the upstream opening end portion 45 toward the downstream opening end portion 43, subsequently entering the circumferential edges 31c of the vanes 31 from the downstream opening end portion 43.

On the other hand, when the amount of air passing through the compressor 19 decreases to such a low flow rate that causes surging, the air passing through the recirculation flow path 41 flows in a reverse direction from the downstream opening end portion 43 toward the upstream opening end portion 45 to be reintroduced into the intake-air channel 21 and then to the impeller wheel 7. As a result, the amount of air flowing into the leading edges 31a of the vanes 31 apparently increases, which makes it possible to reduce the surge flow rate at which surging occurs.

Further, providing the recirculation flow path 41 makes it possible to reduce the surge flow rate. However, the impeller wheel 7 generates noise of a certain frequency determined on the basis of the number of the vanes 31 and the rotation speed. Thus, the length of the recirculation flow path 41 in the direction of the rotational axis line M and the number and cross sections of the circulation voids 51 may be required to be set such that a frequency range associated with the circulation voids 51 is not resonant with the frequency generated by the impeller wheel 7.

The compressor housing 15 is divided into three sections including the upstream housing 15a, the downstream housing 15b and the shroud-side housing 15c as in the present embodiment, which makes it possible to easily change the length of the recirculation flow path 41 in the direction of the rotational axis line M and the number of the circulation voids 51, which are to be set to address the noise, only by changing the upstream housing 15a and the downstream housing 15b.

(Swirl-Flow Generating Unit)

Next, the swirl-flow generating unit 61 will be described.

Figure 2:
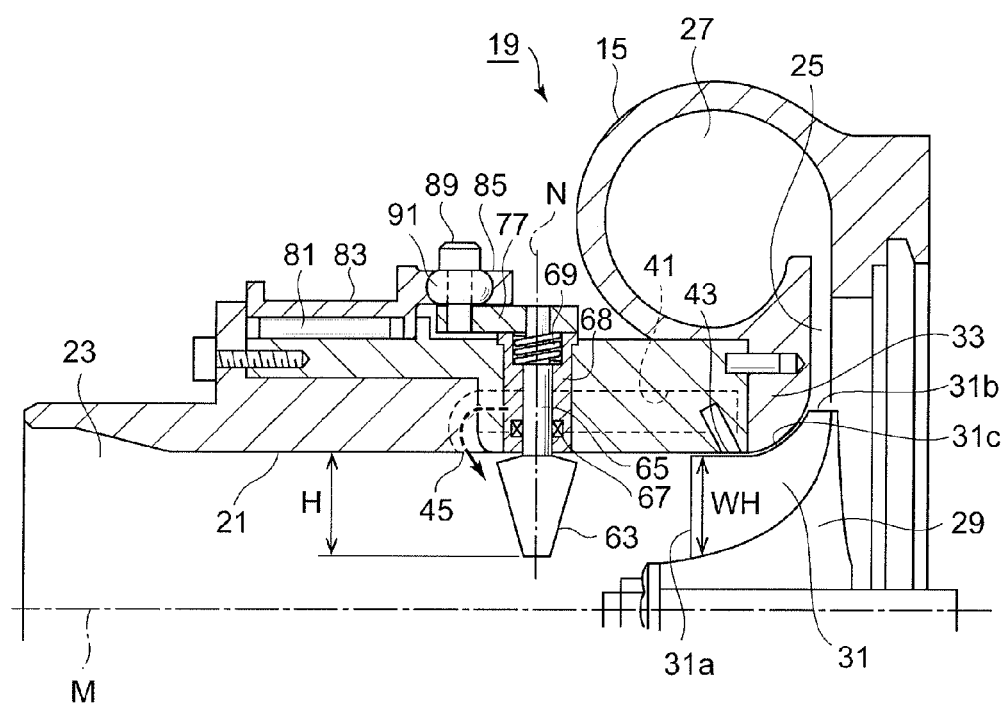
FIG. 2 is a partial enlarged view of FIG. 1.
Figure 3:
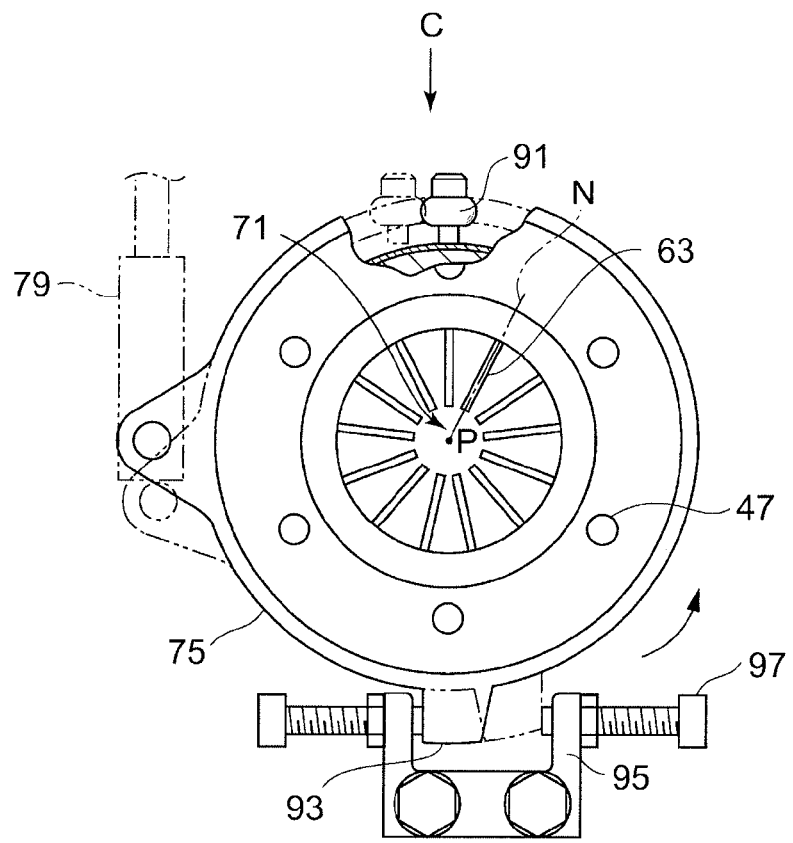
FIG. 3 is a partial cross-sectional view as seen in the direction "A" of FIG. 1.

As illustrated in FIGS. 1 to 3, the swirl-flow generating unit 61 is disposed in the interior of the intake-air channel 21 of the downstream housing 15b and arranged between the intake-air inlet 23 and the impeller wheel 7 so as to swirl the air flowing in from the intake-air inlet 23 around the rotational axis line M. Specifically, the swirl-flow generating unit 61 includes a plurality of guide vanes 63 arranged along the circumferential direction on the inner circumferential wall of the intake-air channel 21 of the downstream housing 15b.

As illustrated in FIG. 1, each guide vane 63 includes a guide-vane main shaft 65 and is attached to the far end portion of the guide-vane main shaft 65 to be rotated around the guide-vane main shaft 65. Also, the center lines N of the guide-vane main shafts 65 are arranged to spread radially from the center point P of the intake-air channel 21 as illustrated in FIG. 3.

The guide vanes 63 each include a plate member of a thin plate-like shape whose shape in the direction of the rotational axis line M is a substantially trapezoidal quadrilateral with a tip end narrower than a root end. Each plate member has a flat plate-like shape where the thickness is constant. Alternatively, the thickness of the plate may be thick at the root end, decreasing toward the tip end. Also, the plate-like shape may be such that the thickness is reduced at the root end and the tip end while it is increased at the center part.

The height H of each guide vane 63 is substantially identical to the height WH of the leading edge 31a of each vane 31 of the impeller wheel 7. As a result, the swirl flow caused by the guide vanes 63 efficiently acts on the vanes 31 of the impeller wheel 7.

Further, the guide vanes 63 are attached so that the inclination angle θ with respect to the rotational axis line M is variable. By means of the inclination angle θ, the air having flowed in the direction of the rotational axis line M is swirled in the same direction as the rotational direction of the impeller wheel 7, thereby generating a swirl flow. The swirl flow swirls the intake-air flow flowing into the vanes 31, which makes it possible to further promote the above described reduction of the surge flow rate achieved by the recirculation flow path 41.

The inclination angle θ is preferably greater than 0 degree and not greater than 60 degrees (0°<θ≤60°), where the direction in the rotational axis line M is 0 (zero) degree and the vane surface extending perpendicularly to the rotational axis line M is 90 degrees. When the inclination angle θ is greater than 60 degrees, the flow loss increases, considerably affecting the decrease in efficiency due to the pressure loss even though the surge is improved.

As illustrated in FIG. 2, the guide-vane main shafts 65 penetrate through the downstream housing 15b to protrude out from the outer side of the housing. The guide-vane main shafts 65 are supported to be rotatable via the supporting bushes 68 in the through holes. Also, a seal member 67 and a return spring 69 are interposed between each guide-vane main shaft 65 and the corresponding supporting bush. A biasing force is constantly acting to return the inclination angle θ of the guide vanes 63 to zero because the return springs 69 are provided. As a result, a state where the guide vanes 63 are stuck at an inclined position is avoided.

On the inner circumferential side of the plurality of guide vanes 63, a central intake-air flow path 71 is formed. The central intake-air flow path 71 causes the air flowing from the intake-air inlet 23 to flow through the impeller wheel 7 without passing through the guide vanes 63. The flow resistance of the intake air in the central intake-air flow path 71 is small, and thus the effect of restricting decrease in the choke flow rate (maximum flow rate) is high.

Although the inner circumferential edge part of the guide vanes 63 is open in the present embodiment, the inner circumferential edge part may be supported by a cylindrical member. Using a cylindrical member for support as described above improves the supporting rigidity of the guide vanes 63, thereby enhancing stable support of the guide vanes 63 and control accuracy of the inclination angle.

(Guide-vane Moving Mechanism)

Next, a guide-vane moving mechanism 73 will be described.

The guide-vane moving mechanism 73 is disposed so as to surround the outer side of the downstream housing 15b, mainly including a drive ring 75 of an annular shape, lever members 77, and an actuator 79. The drive ring 75 is rotatable along the outer circumference of the downstream housing 15b. The lever members 77 connect the drive ring 75 and the outer end portions of the guide-vane main shafts 65. The actuator 79 drives the drive ring 75.

A groove having a recessed cross section is formed on the outer circumferential face of the downstream housing 15b in the circumferential direction, and the drive ring 75 of an annular shape is fitted into the groove to be freely rotatable via a roller bearing 81.

The drive ring 75 includes a rotating part 83 which is fitted into the recessed groove via the roller bearing 81 and an arm part 85 formed integrally with the rotating part 83 to extend in the direction of the rotational axis line M. The arm part 85 includes cutouts 87 each having a recessed shape opening toward the right side in FIG. 1, the cutouts being arranged along the circumferential direction.

Also, with regard to the lever members 77 connected to the outer end portions of the guide-vane main shafts 65, an end of each lever member 77 is fixed to the corresponding one of the guide-vane main shafts 65, while a roller 91 is attached to the other end of each lever member 77 to be freely rotatable. Each roller 91 is loosely fitted inside the corresponding one of the cutouts 87 of a recessed shape of the arm part 85.

Figure 4:
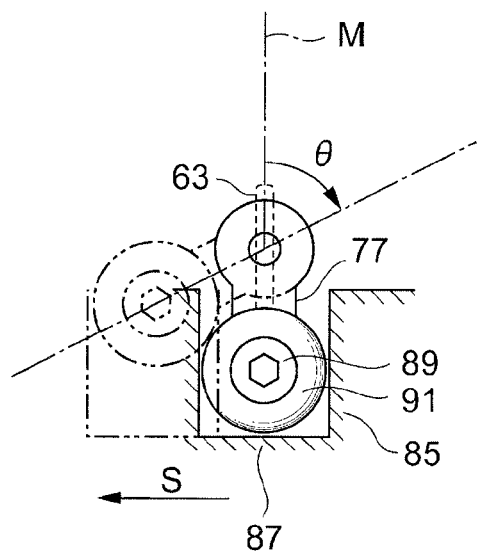
FIG. 4 is an illustrative diagram as seen in the direction "C" of FIG. 3.

Accordingly, when rotating the drive ring 75 with the actuator 79, the arm part 85 of the drive ring 75 moves in the circumferential direction (moves in the direction of the arrow S in FIG. 4), accompanied by the lever members 77 each rotating around the center line N of the corresponding guide-vane main shaft 65. As a result, the guide vanes 63 rotate in accordance with the rotation of the drive ring 75.

The rotational range of the guide vanes 63 is restricted by the contact between a protruding portion 93 disposed on the drive ring 75 and a stopper 95 disposed on the shroud-side housing 15c of the compressor housing 15. Also, the restricting range of the stopper 95 is adjustable with an adjustment screw 97.

Accordingly, the inclination angle θ of the guide vanes 63 is set to be in the range of 0°<θ≤60°, for instance, by use of the stopper 95 and a biasing force is applied by the return springs 69 to constantly keep the inclination angle θ at 0°, which makes it possible to avoid a state where the guide vanes 63 are stuck in an inclined position. Further, it is possible to restrict the decrease in the choke flow rate with the guide vanes by making the inclination angle variable as needed, compared to a case in which the inclination angle of the guide vanes is fixed at a certain angle.

Figure 8:
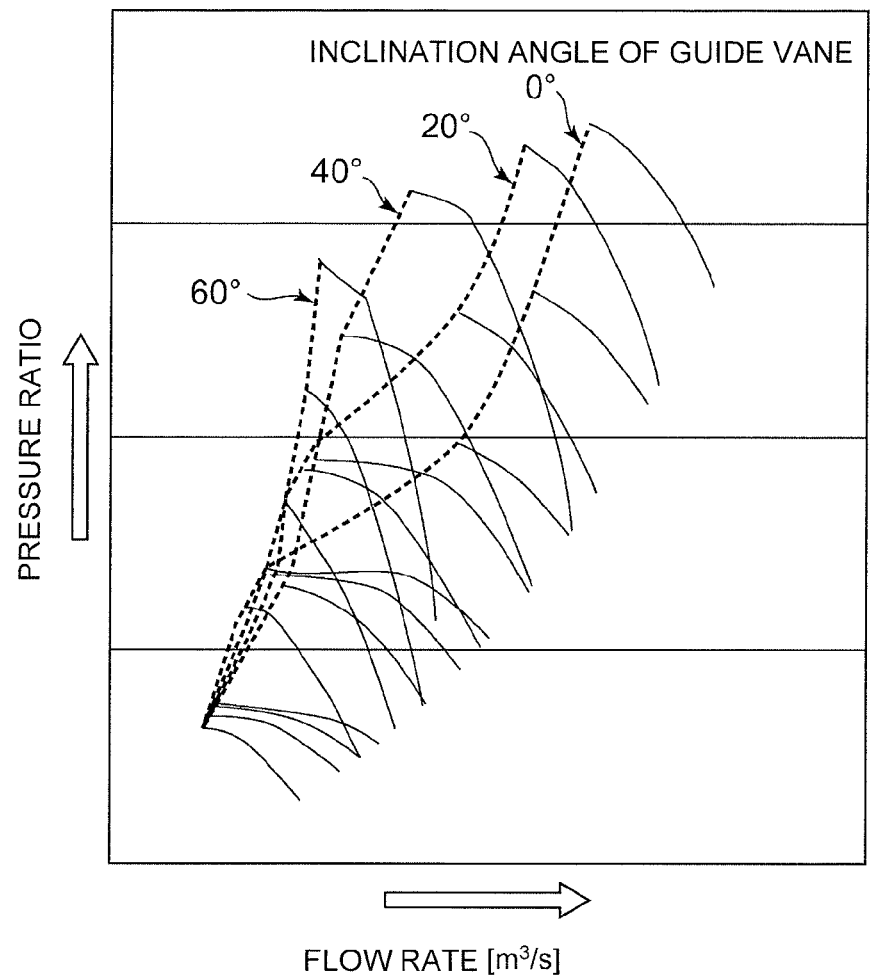
FIG. 8 is a characteristic diagram of a changing trend of a surging line based on the inclination angle of the guide vanes.
Figure 9:
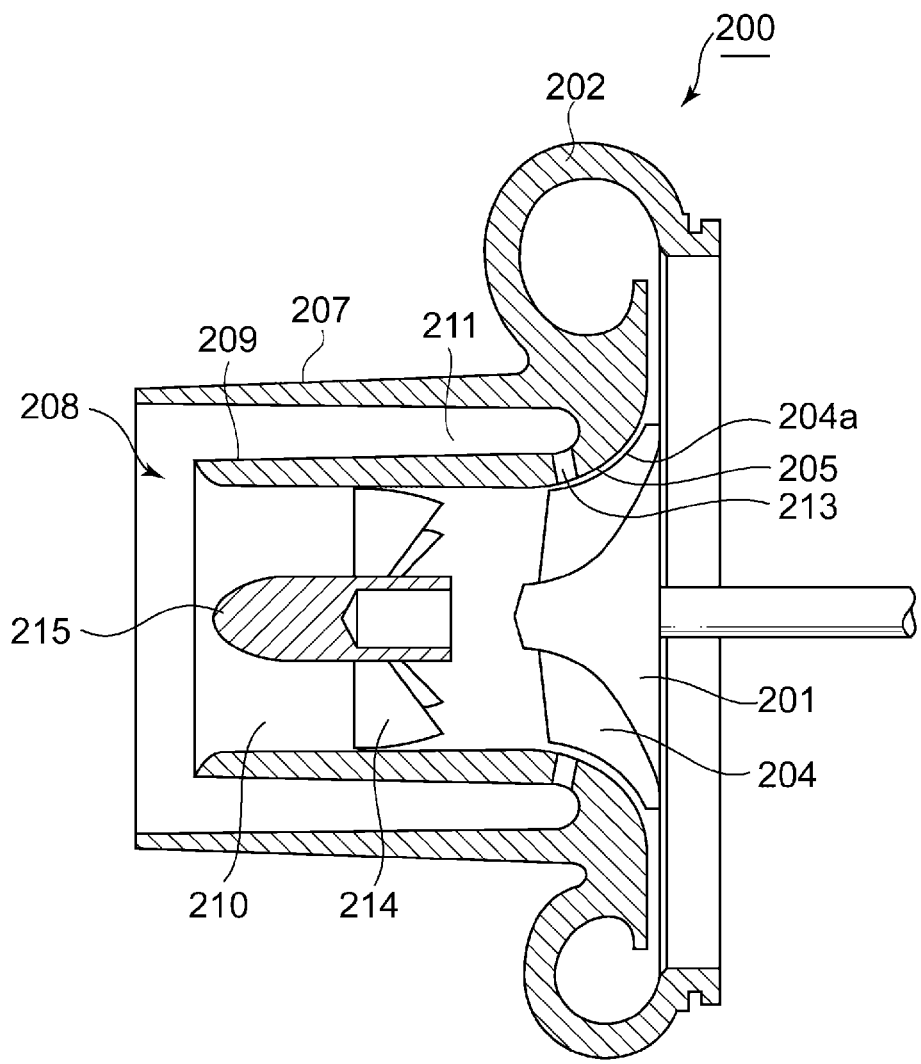
FIG. 9 is a cross-sectional illustrative diagram of a conventional centrifugal compressor.
Figure 10:
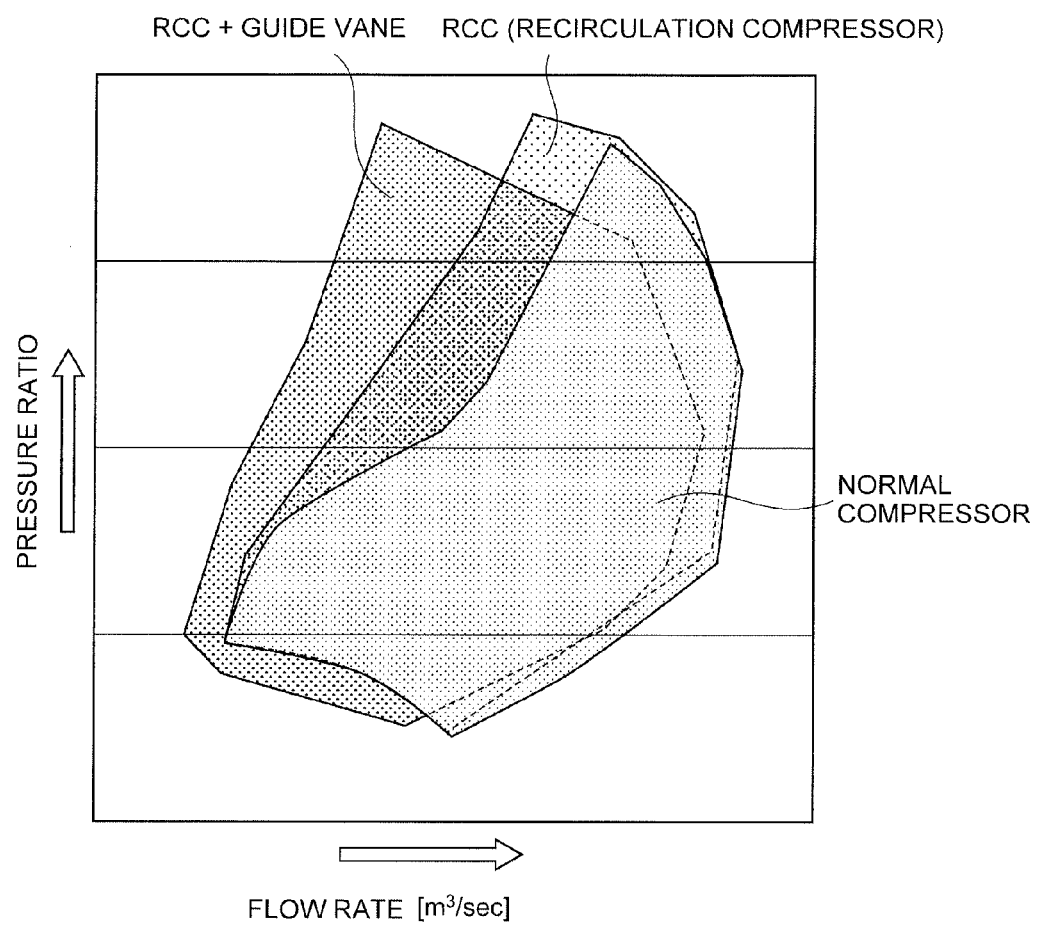
FIG. 10 is a comparison graph of common performance characteristics of centrifugal compressors.

FIG. 8 illustrates change in the surging line with the inclination angle θ of the guide vanes 63 being varied between 0°, 20°, 40°, and 60°. It can be seen that increasing the inclination angle θ of the guide vanes 63 enhances the effect of generating a swirl flow, and thus it is possible to reduce the surge flow rate.

Thus, in accordance with the operation state of the internal combustion engine, i.e., in accordance with the flow rate passing through the compressor 19, the vane inclination angle θ of the guide vanes 63 is varied, so that, the flow rate is for instance controlled to be even lower to prevent surging from occurring at an operating point by increasing the vane inclination angle θ during operation at a low flow rate in which the rotation speed or the load is low, or the flow rate is controlled to be high in consideration of the choke flow rate rather than the surging by decreasing the vane inclination angle θ when the operating point is at the high-flow-rate side such as operation in which the rotation speed or the load is high.

As described above, according to the first embodiment, in addition to the improvement of the surge margin (surge generation limit) by use of the recirculation flow path 41, swirling the intake-air flowing in from the intake-air inlet 23 by the guide vanes 63 further reduces the surge flow rate (minimum flow rate) to improve the surge margin.

Further, the central intake-air flow path 71 formed on the inner circumferential side of the guide vanes 63 reduces the flow resistance with respect to the intake air, which makes it possible to restrict the decrease in the choke flow rate (the maximum flow rate). As a result, it is possible to increase the operation range of the compressor 19.

That is, it is possible to increase the operation range compared to a compressor only having a recirculation flow path, or to a compressor having a cone member in the center of the intake-air channel though having guide vanes as described in Patent Document 1.

Further, according to the first embodiment, the inclination angle of the guide vanes 63 is variable, which makes it possible to set the optimum angle suitable for improving the surge flow rate (minimum flow rate) and the choke flow rate (maximum flow rate) in accordance with the operation state of the internal combustion engine.

Further, the plurality of guide vanes 63 arranged in the circumferential direction protrude to the outside of the compressor housing 15 so that each guide-vane main shaft 65 is rotated from the outside of the compressor housing 15. Thus, it is possible to control the inclination angle of the guide vanes 63 without affecting the air flow inside the intake-air channel 21.

Furthermore, the guide-vane moving mechanism 73 which allows the inclination angle of the guide vanes 63 to be variable mainly includes the drive ring 75 of an annular shape formed so as to surround the outer side of the downstream housing 15b to be rotatable along the outer circumference of the downstream housing 15b, the lever members 77 engaged with the drive ring 75, and the actuator 79 which rotates the drive ring 75. Thus, it is possible to make the guide-vane moving mechanism 73 compact, and it is also possible to simultaneously rotate the plurality of guide vanes 63 to the same inclination angle with high accuracy.

(Second Embodiment)

Next, the second embodiment will be described in reference to FIG. 6.

The second embodiment is different from the first embodiment in that there is no recirculation flow path 41 provided. Other configurations are the same as those in the first embodiment.

Figure 6:
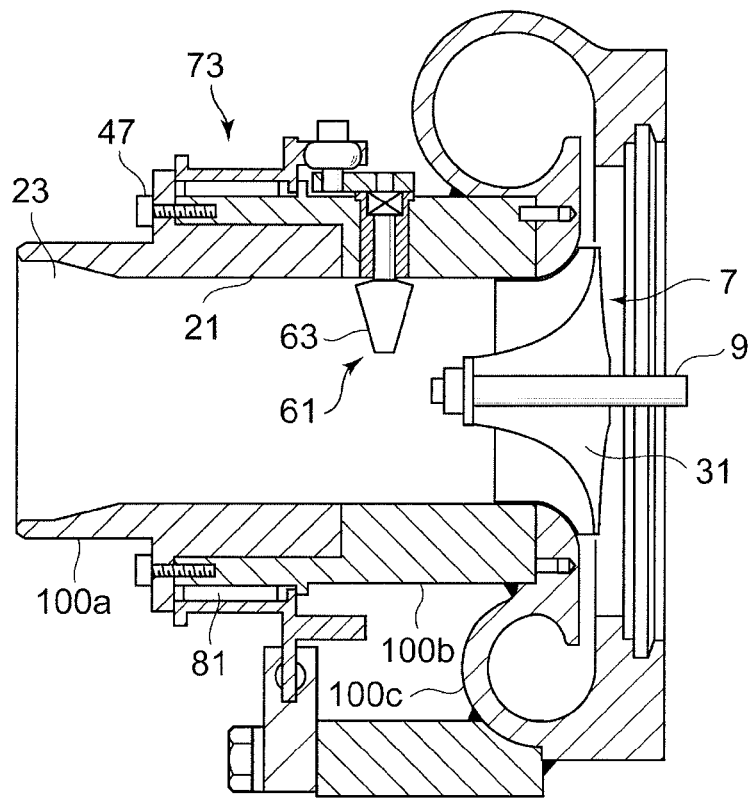
FIG. 6 is a partial cross-sectional view of the second embodiment, corresponding to FIG. 1.

As illustrated in FIG. 6, the compressor housing 100 is divided into three sections including an upstream housing 100a, a downstream housing 100b, and a shroud-side housing 15c including the air channel 27 of a spiral shape. The upstream housing 100a and the downstream housing 100b do not include a recirculation flow path 41.

Further, the fitting surface of each component has a socket-and-spigot structure so that the positions of the components are determined in the direction of the rotational axis line M and in the radial direction.

The guide vanes 63 and the guide-vane moving mechanism 73 here have similar mechanisms as those in the first embodiment.

According to the second embodiment, the upstream housing 100a and the downstream housing 100b do not include a recirculation flow path as illustrated in FIG. 6, unlike the first embodiment, and thus the housing structures at the upstream side and the downstream side are simplified.

As a result, machining for the upstream housing 100a and the downstream housing 100b is facilitated, as well as the assembling work.

Furthermore, the upstream housing 100a and the downstream housing 100b are formed as separate components from each other and are assembled by fitting. Thus, it is possible to change the guide vanes to guide vanes of an appropriate size corresponding to the size of the vanes 31 of the impeller wheel 7.

That is, the guide vanes 63 and the guide-vane moving mechanism 73 which allows the inclination angle of the guide vanes 63 to be variable are provided for the downstream housing 100b, and the downstream housing 100b is attached to the upstream housing 100 by bolts 47, so that it is possible to change the vane shape of the guide vanes 63 by changing the assembly on the downstream housing 100b without replacing the whole compressor housing. Thus, the vane shape of the guide vanes 63 can be changed by changing the downstream housing 100b.

Still further, the functional effect of the swirl-flow generating unit 61 is similar to that of the first embodiment, and is to reduce the surge flow rate (minimum flow rate) to improve the surge margin and to restrict the decrease in the choke flow rate (maximum flow rate) so that the operation range of the compressor is increased with a simplified structure. Also, it is possible to adjust the inclination angle of the guide vanes 63 to an optimum angle corresponding to the operation state by making the inclination angle of the guide vanes 63 variable.

(Third Embodiment)

Figure 7:
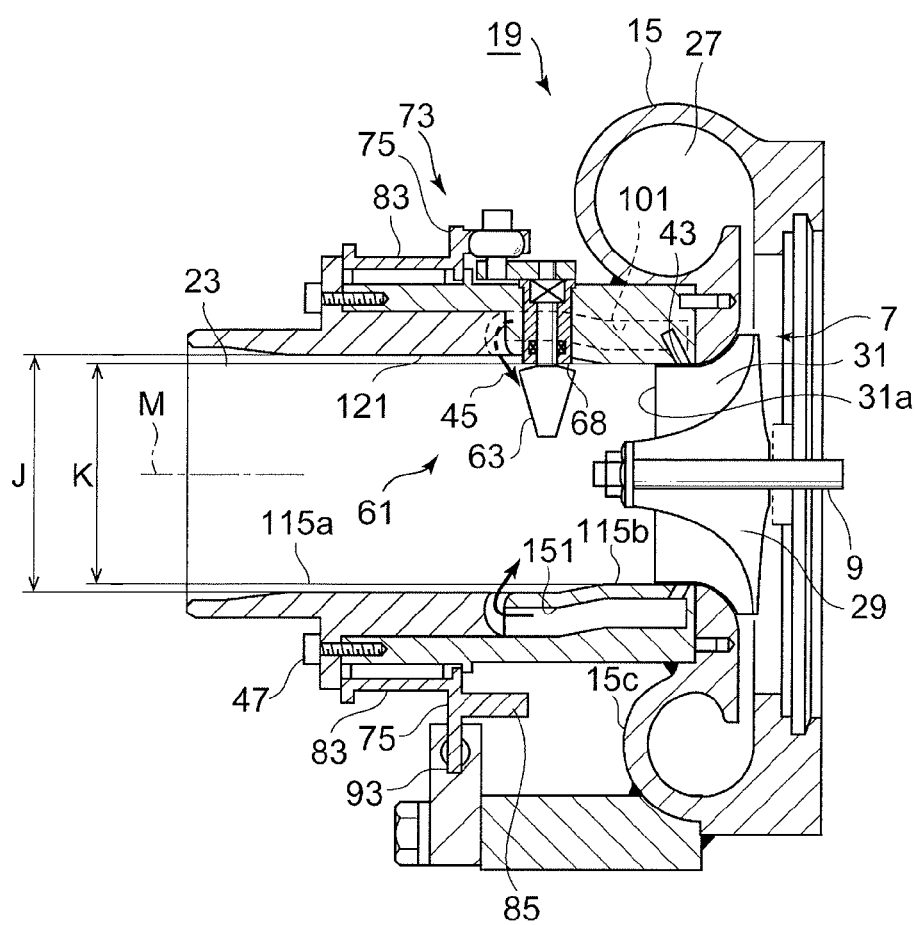
FIG. 7 is a partial cross-sectional view of the third embodiment, corresponding to FIG. 1.

Next, the third embodiment will be described in reference to FIG. 7.

The third embodiment is different from the first embodiment in that the inner circumferential wall of the intake-air channel 21 does not have a cylindrical shape but the inner diameter changes in the direction of the rotational axis line M. Other configurations are the same as those in the first embodiment.

The inner circumferential wall of the upstream housing 115 has a large diameter J, and the inner circumferential wall of the downstream housing 115b is formed to vary from the large diameter J to a small diameter K. The small diameter K is substantially identical to a diameter at the leading edge 31a section of the impeller wheel 7.

The increasing change from the small diameter K to the large diameter J is set so as to increase the flow-path area corresponding to the flow-path area which has been reduced at least by the plurality of guide vanes 63 blocking the flow path.

That is, the portion having the large diameter J is provided so that the flow-path area in the intake-air channel 121 is not reduced by providing the guide vanes 63. The diameter may be further increased taking account of the decrease in the flow path area due to not only the guide vanes 63 but also the lower portions of the supporting bushes 68 supporting the guide vanes 63.

Increasing the diameter to enlarge the intake-air channel 121 leads to compensating the decrease in the flow path area in the intake-air channel 21 caused by providing the guide vanes 63. Thus, it is possible to eliminate the influence of the flow resistance to improve the efficiency and to restrict the decrease in the choke flow rate (maximum flow rate).

INDUSTRIAL APPLICABILITY

According to the present invention, the surge flow rate (minimum flow rate) is reduced by swirling the intake gas flowing in from the intake-air inlet, thereby improving the surge margin, and further, the flow resistance of the intake-air gas in the central intake-air flow path is reduced, which makes it possible to restrict the decrease in the choke flow rate (maximum flow rate), so that it is possible to increase the operating range. Moreover, making the inclination angle of the guide vanes variable makes it possible to change the vane inclination angle of the guide vanes in accordance with the flow rate passing through the compressor. Thus, the present invention may be applied effectively to an exhaust turbocharger of an internal combustion engine.

REFERENCE SIGNS LIST

1 Exhaust turbocharger
7 Impeller wheel
9 Rotational shaft
15, 100 Compressor housing (housing)
15a, 100a, 115a Upstream housing
15b, 100b, 115b Downstream housing
19 Centrifugal compressor
21, 121 Intake-air channel
23 Intake-air inlet
25 Diffuser
27 Air channel of a spiral shape
29 Hub
31 Vane
31a Leading edge of a vane
31b Trailing edge of a vane
31a Outer circumferential edge of a vane (outer circumferential part)
41 Recirculation flow path
43 Downstream opening end portion
45 Upstream opening end portion
51 Circulation void
61 Swirl-flow generating unit
63 Guide vane
65 Guide-vane main shaft
69 Return spring
71 Central intake-air flow path
73 Guide-vane moving mechanism
75 Drive ring
77 Lever member
79 Actuator
69 Return spring
91 Roller
M Rotational axis line
θ Inclination angle of guide vanes

The invention claimed is:

1. A centrifugal compressor, comprising:
a housing having an intake-air inlet which opens in a direction of a rotational axis of the centrifugal compressor, and an intake-air channel which connects to the intake-air inlet;
an impeller wheel disposed inside the housing rotatably around the rotational axis, and configured to compress intake gas which flows in from the intake-air inlet;
a plurality of guide vanes disposed in a circumferential direction along an inner circumferential wall of the housing between the intake-air inlet and the impeller wheel and configured to swirl the intake gas flowing in from the intake-air inlet around the rotational axis;
a central intake-air flow path formed at an inner circumferential side of the plurality of guide vanes and configured to allow the intake gas flowing in from the intake-air inlet to flow to the impeller wheel without passing through the guide vanes; and
a guide-vane moving mechanism which simultaneously changes inclination angles of the plurality of guide vanes with respect to the direction of the rotational axis;
wherein the housing includes a recirculation flow path which is disposed on an outer side of the intake-air channel and which brings an outer circumferential section of vanes of the impeller wheel into communication with the intake-air channel at an upstream side of the impeller wheel,
where the housing is divided in half into an upstream housing and a downstream housing at a position where the recirculation flow path is divided, the housing being further divided into a third part comprising a shroud-side housing having an air channel of a spiral shape at a further downstream side of the downstream housing, and
wherein a plurality of circulation voids are formed in the upstream housing and the downstream housing on the circumference around the rotational axis line to extend in the direction of the rotational axis line, said voids constituting the recirculation flow path.

2. The centrifugal compressor according to claim 1,
wherein each guide vane includes a guide-vane main shaft around which each guide vane is rotated, and
wherein each guide-vane main shaft extends toward a center of the intake-air channel and has an outer end portion penetrating a circumferential wall of the intake-air channel to be positioned at an outer side of the housing and coupled to the guide-vane moving mechanism.

3. The centrifugal compressor according to claim 2,
wherein the guide-vane moving mechanism includes:
a drive ring of an annular shape disposed so as to surround the outer side of the housing to be rotatable along an outer circumference of the housing;
lever members which couple the drive ring and the outer end portions of the guide-vane main shafts; and
an actuator which rotates the drive ring.

4. The centrifugal compressor according to claim 2,
wherein a return spring is disposed between each guide-vane main shaft and the housing so as to apply a biasing force which always returns the inclination angle of each guide vane with respect to the direction of the rotational axis to zero.

5. The centrifugal compressor according to claim 2,
wherein each guide vane is formed by a plate-like member and has a trapezoidal shape which is tapered toward a center of the intake-air channel and is arranged so that a face of the plate-like member is along a flowing direction of the intake-air channel, each guide vane having a height substantially identical to a height of a leading edge of each vane of the impeller wheel.

6. The centrifugal compressor according to claim1,
wherein an opening end portion of an upstream side of the recirculation flow path is positioned upstream with respect to the guide vanes.

7. The centrifugal compressor according to claim 1,
wherein the intake-air channel has an inner diameter including a small diameter at a leading edge part of vanes of the impeller wheel, and a large diameter at an inflow side, the large diameter being larger than the small diameter.

8. The centrifugal compressor according to claim 7,
wherein the large diameter of the intake-air channel is set so as to increase an area of a flow path corresponding to at least an area of the flow path which is reduced by the guide vanes blocking the flow path.

* * * * *